July 30, 1957 R. KOBLER ET AL 2,801,292

DICTATION RECORDING SYSTEM

Filed March 23, 1956

INVENTOR
Richard Kobler
Martin J. Kutik
BY George H. Fritzinger
Agt.

United States Patent Office 2,801,292

Patented July 30, 1957

2,801,292

DICTATION RECORDING SYSTEM

Richard Kobler and Martin J. Kutik, New York, N. Y., assignors, by mesne assignments, to McGraw-Edison Company, Elgin, Ill., a corporation of Delaware Application March 23, 1956, Serial No. 573,360

7 Claims. (Cl. 179—100.1)

This invention relates to improvements on the multistation, remotely-controlled phonographic system described in the Logan Patent 2,690,480 issued September 28, 1954, and is in other respects a modification of the co-pending application of William W. Logan, Serial No. 557,266, filed January 4, 1956, and having common ownership with the present application.

The foregoing patent describes a system wherein a plurality of remote dictators' stations are connectable in parallel with a single recording machine to permit private use of the machine from any one of the different stations without intrusion or interference from any of the other stations. In the present invention such multistation recording system is provided with a plurality of recording machines with selector switches at the stations to enable a station operator to selectively connect his station to an available machine when other machines of the system are in use, while still providing complete privacy to each dictator in the use of his selected machine.

It is an object of our invention to provide a multistation recording system with facility for selecting between different recording machines at each station while providing complete privacy to each user of the system.

Another object is to provide improvements in the privacy system of the aforestated Logan patent which are adapted to maintain privacy to each user when the facility is provided at each station for selecting between different recording machines.

In the aforementioned Logan patent there is provided a privacy relay at each dictator's station which must be in an operated position before the station can be operatively connected to a recording machine. This means that when the selector switch is shifted out of a position corresponding to an activated machine and into a position corresponding to another activated machine, the privacy relay must be returned to unoperated position before the selector switch reaches the latter position else operative connection will be made with the other activated machine. By our invention a return of the privacy relay to unoperated position during such shifting of the selector switch is assured by the use of simple electrical means controlled by the selector switch.

These and other objects and features of our invention will be apparent from the following description and the appended claims.

In the description of our invention reference is had to the accompanying drawings, of which:

Figures 1, 2, 3:
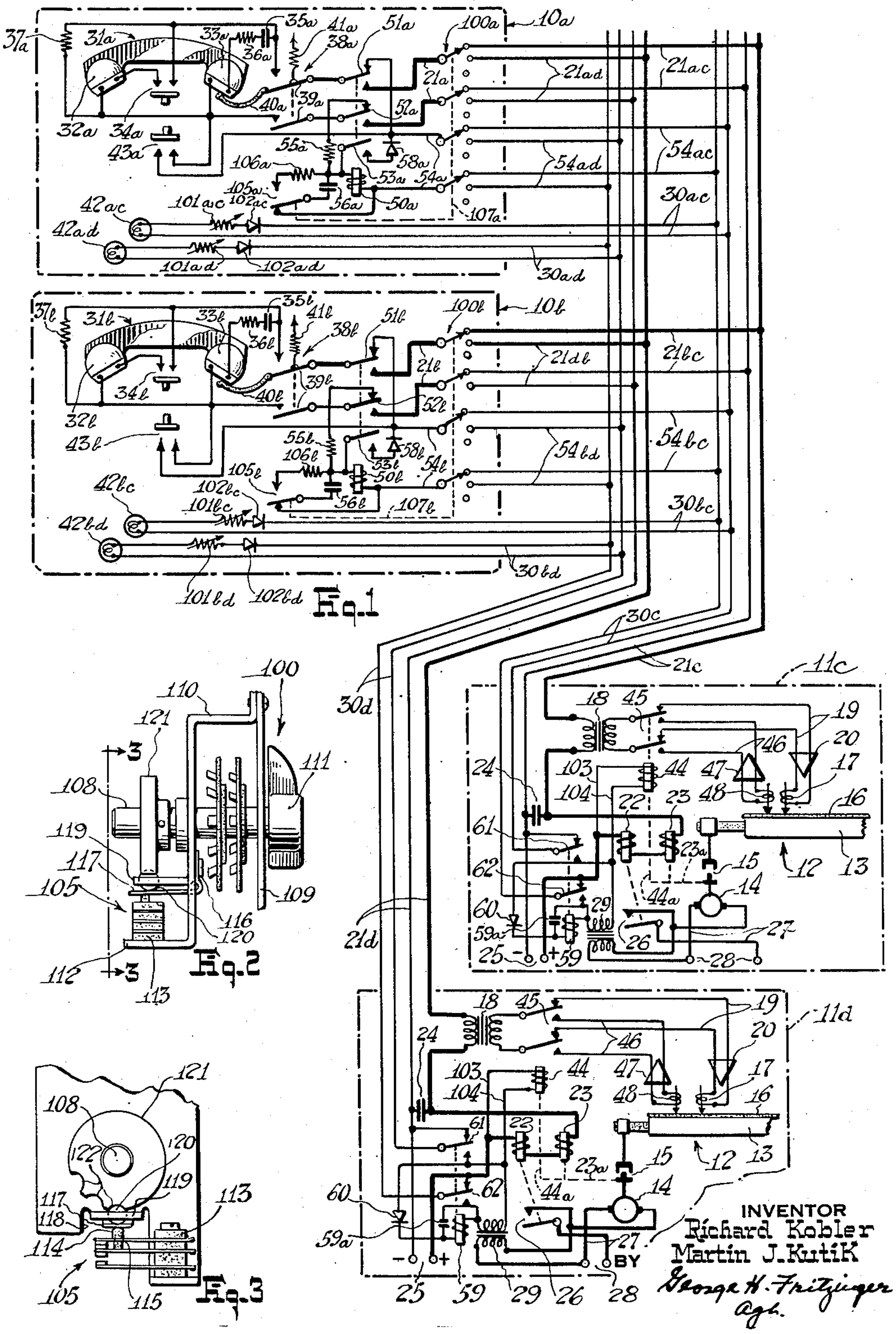
Figure 1 is a schematic circuit diagram of a remotely-controlled multistation dictation-recording system having facility for selecting between a plurality of recording machines at each station and of providing privacy to each user of the system.
Figure 2 is a side view of a station selector switch unit as embodied in our dictation-recording system illustrated in Figure 1.
Figure 3 is a fractional end view of this selector switch unit as seen from the line 3—3 of Figure 2.

In the following description only such portions of the recording machines are shown and described as need be considered for the purposes of the present invention, and these portions are only diagrammatically illustrated.

The illustrative embodiment shown in Figure 1 comprises a plurality of identical dictators' stations of which two, shown by way of example, are referred to as **10*a* and 10*b*, and comprises further a plurality of attendants' stations of which two, shown by way of example, are referred to as 11*c* and 11*d*. At each attendant's station there is a dictating machine 12 (fractionally shown) which comprises a turntable 13 driven by a motor 14 through a clutch 15. The turntable carries a record disk 16 engaged by a recording unit 17. Audio speech-representing currents are fed to this recording unit through an audio transformer 18 and a circuit 19 including an amplifier 20**.

Each attendant's station is provided with a communication or audio circuit referred to by the number 21 with the suffix letter of the respective station, which serially includes the primary of the audio transformer 18. This communication circuit is used also to control the machine, and for the latter purpose it includes two serially-connected relays 22 and 23. Audio currents in the communication circuit are by-passed around these relays through a condenser 24. The communication circuit is energized from a low-voltage D. C. power source referred to by the terminals 25. The relays are adapted to operate at different levels of direct current established selectively at the dictators' stations, as will appear. The relay 22 has contacts 26 operated at the lower current level to close a power circuit 27 serially including the motor 14. This power circuit is energized from an A. C. source represented by the terminals 28. The second relay 23 is adapted to operate at a higher current level and controls the clutch 15 as represented diagrammatically by the tie line **23*a*. These relays may of course perform still other control functions which need not however be herein described. For the present purposes it will be understood that the motor 14 is started when the relay 22 is operated and that the clutch 15 is engaged to start rotation of the turntable 13 when the relay 23 is operated. An energization of the communication circuit 21 at the lower current level, with the resultant starting of the motor 14** or other conditioning of the machine for immediate start-stop operation, is herein considered as an activation of the dictating machine.

In the power circuit 27 and in shunt with the motor 14 is the primary of a voltage stepdown transformer 29. This transformer provides an A. C. voltage for signaling purposes as is later described.

The dictators' stations **10*a* and 10*b*** may be identical and therefore a description of one will suffice for both. Corresponding elements of these stations are given the same reference numbers but with the suffix letters of the respective stations.

The dictator's operating equipment at each dictator's station, described for example with reference to the station **10*a*, comprises a handpiece 31*a* of the usual telephone variety including as transducer elements a carbon button microphone 32*a* and a receiver 33*a*. The microphone 32*a* is connectable across the communication circuit at the dictator's station through a manual "record" switch 34*a* and a double-pole on-off station switch 38*a* having a pole 39*a* in each line of the communication circuit. Both poles are closed with their respective contacts when the station switch is in "on" position and are broken therefrom when the station switch is in "off" position. The receiver 33*a* is connectable across the same communication circuit at the dictator's station by closure of the station switch, but this connection is made through a condenser 35*a* and a resistor 36*a*. Additionally, there is a resistor 37*a* at the dictator's station which is in parallel with the series arrangement of microphone 32***a* and switch 34*a*, as well as with the series arrangement of receiver 33*a*, condenser 35*a* and resistor 36*a*.

At least one of the movable pole elements 39*a* of the station switch 38*a* is associated with a support for the hand-piece 31*a* as, for example, by providing it with a hook-shaped extension 40*a* adapted to receive the handpiece and support it when the station switch is not in use. The pole elements of the station switch are urged upwardly into closed positions by the spring 41*a*, but when the handpiece is placed on the support 40*a* the weight thereof is sufficient to overcome the spring and to hold the station switch open.

Each dictator's station has a link circuit designated by the number 21 with the suffix letter of the respective station. Interposed between the on-off station switch and the link circuit 21*a* of station 10*a* are the poles 51*a* and 52*a* of a privacy relay 50*a* whose coil is shunted by a filter condenser 56*a*, and interposed between the link circuit 21*a* and the main communication circuits of the respective machines is a selector switch 100*a* connectable selectively to respective branches leading off from the main communication circuits and referred to by the number 21 with the suffix letters of the respective dictators' and attendants' stations. For instance, the selector switch 100*a* of the dictator's station 10*a* is connectable to branch 21*ac* leading to the communication circuit of the attendant's station 11*c* or to the branch circuit 21*ad* leading to the dictator's station 11*d*. Thus, when the station switch is closed and the privacy relay is operated, the resistor 37*a* completes a direct current connection across that one of the main communication circuits 21 to which the respective selector switch is connected. Such direct current connection across the main communication circuit causes current to flow therein at the lower current level from the source 25 to operate the relay 22. Such operation of this relay activates the machine as is hereinbefore described. If the record switch 34*a* is also closed, the resultant parallel connection of the carbon button microphone 32*a* across the resistor 37*a* steps up the flow of current to a higher level to operate also the relay 23. Operation of this relay engages the clutch to start the machine running.

Each recording machine has a signal-control circuit designated by the number 30 with the suffix letter of the respective attendant's station. Leading from each signal-control circuit to each dictator's station is a branch signal circuit designated by the number 30 with the suffix letters of the respective attendant's and dictator's stations. For instance, there are two such branch signal circuits leading to the station 10*a* designated as 30*ac* and 30*ad*. Each branch signal circuit serially includes a signal lamp and an adjustable resistor designated respectively by the numbers 42 and 101 with the suffix letters of the respective attendant's and dictator's stations. The adjustable series resistor is provided as a means for compensating for differences in the resistances of different lengths of lines between the stations.

Each main signal-control circuit of the respective machines is normally connected across the D. C. source 25 through the poles 61 and 62 of switches constituting part of a transfer relay 59. The coil of this relay is connected across the secondary of the signal transformer 29 through a rectifier 60 so that the relay 59 will be operated when power is supplied to the transformer—which will occur when the recording machine is activated as has been explained. (Shunting the coil of each relay 59 is a filter condenser 59*a* which is made sufficiently large to assure that the relay 59 will drop out after the drop-out of the privacy relay 50 when the machine is deactivated by the dictator hanging up his handpiece to open the station switch.) When the relay 59 is operated, the poles 61 and 62 are moved to connect the signal-control circuit across the secondary of the signal transformer 29. Thus, until a machine is activated, a D. C. potential is applied to the signal-control circuit, and when the machine is activated an A. C. potential is applied to this circuit. In order that the D. C. voltage may not operate the signal lamp at any of the dictators' stations, a rectifier is connected in series with each lamp but in opposite polarity to the voltage applied in the circuit from the D. C. source 25, the rectifier being referred to by the number 102 with the suffix letters of the respective dictator's and attendant's stations.

When the on-off station switch 38*a* of station 10*a* is first closed while the selector switch 100*a* is in a position corresponding to an unactivated machine, say the machine of the attendant's station 11*c*, the privacy relay 50*a* is not yet operated but the coil of this privacy relay is connected in a circuit across the signal control circuit 30*c* of that machine via a branch circuit 54*ac* leading from the signal control circuit 30*c* to the selector switch 100*a*, a link circuit 54*a* interconnecting two poles of the selector switch 100*a* with the upper contacts associated with the poles 51*a* and 52*a* of the privacy relay (which link circuit serially includes the coil of the privacy relay and a resistor 55*a*), the station switch 38*a* and the resistor 37*a*. Since the potential source 25 is then connected across the signal-control circuit of that relay, the condenser 56*a* is first charged and then the privacy relay is operated. The contacts 53*a* of the relay 50*a* are so arranged as to close before the poles 51*a* and 52*a* break with their upper contacts. This is done so as to assure a continuous supply of operating current to the privacy relay from the signal control circuit; however, the supply is now provided through a rectifier 58*a* which is poled with the polarity of the D. C. source 25 so as not to introduce any appreciable resistance in the circuit. As soon as the poles 51*a* and 52*a* make with their lower contacts the resistance 37*a* is connected in the communication control circuit 21*c* to complete that circuit across the source 25. This causes the relay 22 to operate. Operation of the relay 22 closes the power switch 26 to start the motor and to provide power to the signal transformer 29. Power from the secondary of the signal transformer then operates the transfer relay 59 through the rectifier 60. As the relay 59 is operated, the signal-control circuit 30*c* is disconnected from the D. C. power source 25 and is connected to the secondary of the transformer 29 to provide the signal circuit with A. C. power. Although the privacy relay 50*a* is one operable only by direct current, the connection of this relay through its holding circuit completed via the contacts 53*a*, the rectifier 58*a* and the link circuit 54*a* across the signal control circuit 30*c* serves to provide a rectified current to maintain the privacy relay operated. The condenser 56*a* then serves as a filter element for the D. C. pulses supplied to the coil of the privacy relay.

From the foregoing description it is apparent that closing the station switch 38*a* when the selector switch 100*a* is in a position corresponding to an idle machine serves to connect the resistor 37*a* across the communication control circuit of that machine, to energize the privacy relay 50*a* of the dictator's station and to activate the machine, which activation operates the relay 59 to shift the signal-control circuit of that machine from the D. C. source 25 to the signal transformer 29 to provide this circuit with A. C. power. Upon energization of the signal-control circuit by A. C. power, the signal lamp corresponding to that machine now lights because the rectifier in the branch signal circuit passes current to the lamp. Similarly, the lamps at all other dictator's stations corresponding to that machine will now also be lit to give indication at all other stations that that particular machine is in use.

Once a dictator's station is so operatively connected to an available machine to activate the same, that machine can be started and stopped at will by pressing and releasing the record switch 34*a*. Dictation spoken into the microphone 32*a* will be then amplified by the amplifier 20 and recorded on the record by the recorder 17.

At the dictator's station 10a there is also a normally-open "listen" switch 43a operable to interconnect the negative side of the communication-control circuit at the dictator's station with one line of the selected branch signal circuit at the dictator's station. When the listen switch is closed while the station 10a is connected to the machine at the attendant's station 11c, a circuit is completed from the positive side of the D. C. source 25 through a record-reproduce relay 44 via a lead 103, the coil of the relay 44, lead 104, pole 61 of the relay 59, one side of the signal control circuit 30c, one side of the branch circuit 54ac and of the link circuit 54a via the third pole from the top of the selector switch 100a, the listen switch 43a, one pole of the station switch 38a, a pole 52a of the privacy relay 50a, negative side of the branch circuits 21a and 21ac via the second pole from the top of the selector switch 100a, and the negative side of the communication control circuit 21a to the negative side of the source 25. The relay 44 has a double-pole switch 45 for shifting the connection of the audio transformer 18 from the recording lines 19 to a pair of reproducing lines 46 which are connected through an amplifier 47 to a reproducer 48. This reproducer normally engages the record disk and is moved with the recorder 17 at a trailing distance therefrom (it will be understood that the recorder 17 and reproducer 48 may be lifted from the record disk as for purposes of making a record change, but that the means for doing this need not be herein described). The relay 44 has also an operative connection with the clutch 15 as represented by the tie line 44a, which is for the purpose of engaging the clutch to start record rotation whenever the listen switch 43a is closed while the dictator's station is operatively connected with one of the recording machines.

Since each privacy relay is operable only by direct current and an effect of operatively connecting a dictator's station to an available machine is to shift the power supply for the signal-control circuit from a D. C. to an A. C. source, it follows that once a machine is activated, any attempt at another dictator's station to connect that station to a machine already in use will not result in the privacy relay of that station being operated. Since operation of the privacy relay of a dictator's station is necessary to enable a dictator's audio and control equipment to be operatively connected via the respective communication-control circuit to a recording machine, it follows that no dictator can operatively connect his station equipment to a machine already in use either to listen in the dictation being recorded or reproduced or to interfere in any way with the operation or control of that machine.

The foregoing privacy system is entirely foolproof when a plurality of dictators' stations are connectable to only a single recording machine. However, when there are provided a plurality of recording machines and each dictator's station is provided with a selector switch to enable selective connection of a dictator's station with those machines, the foregoing privacy system may fail under certain conditions. For instance, if a dictator's station is connected to one machine and some other dictator's station is connected to another machine corresponding to an adjacent position of the selector switch of the first dictator's station, a quick shift of that selector switch to the adjacent position may not cause the privacy relay of the first station to drop out, notwithtanding that power to the privacy relay is cut off momentarily during movement of the selector switch between positions, because of stored-up electrical energy in condenser *56a* and of inherent magnetic retentivity tending to hold the relay operated. As a result, connection would be made to the other activated machine while the first dictator's privacy relay is still operated. The privacy relay of the first dictator's station thus receives holding current from the other machine via the holding circuit of the privacy relay as soon as the selector switch makes connection with the other machine. Since the privacy relay is operated, a complete operative connection of the first dictator's station is made to the other machine already in use.

In order to assure that the privacy relay of a dictator's station will drop out whenever the selector switch of that station is shifted to an adjacent position corresponding to an already activated machine, we provide a control switch at each dictator's station, designated by the number 105 with the suffix letter of the respective station, which serves to disconnect the respective condenser 56 from the coil of the respective privacy relay, discharge the condenser and thereupon reconnect the condenser across the relay coil in the interim while the selector switch is moved between two successive positions. For instance, with reference to station 10a, the switch 105a is positioned normally to connect the condenser 56a across the coil of the privacy relay 50a but, when operated, it serves to disconnect the condenser from the relay coil and to discharge the condenser through a current-limiting resistor 106a. A momentary operation of the switch 105a during a shifting of the selector switch from one position to the next is provided by means of a coupling between the switch 105a and the selector switch 100a, which is designated by the tie line 107a in Figure 1 and which is shown in mechanical detail in Figures 2 and 3. In Figures 2 and 3, however, the parts are designated by reference characters without suffix letters.

Each selector switch 105 may be of the rotary wafer type having pole elements mounted on a shaft 108. The shaft is rotatably mounted in front and back parallel frame plates 109 and 110 and is operable by a knob 111. Bent rearwardly from one end of the back plate 110 is a lug 112 supporting the switch 105. This switch comprises, for example, an insulating stack 113 carrying three switch blades of which the central blade is a pole member biased upwardly to make normally with the upper blade as shown in Figure 3. Staked to an intermediate portion of this pole member is an insulating pushbutton 114 which passes through a clearance opening 115 in the upper blade. Secured at 116 to the front side of the plate 110 is a cantilever spring 117 which extends rearwardly through an opening 118 in the plate 110 to overlie the pushbutton 114. Above this spring is a spaced parallel lug 119 struck rearwardly also from the back plate 110. This lug is provided with an oversized aperture for holding loosely a hard metal ball 120 which is interposed between an intermediate portion of the cantilever spring 117 and a notched peripheral portion of a disk 121 secured to the shaft 108. The disk has three notches 122 (Figure 3) corresponding respectively to the three positions of the selector switch shown in Figure 1. In any one position of the selector switch the ball engages the corresponding notch under influence of the cantilever spring 117 to allow the switch 105 to make with its upper contact. However, upon shifting the selector switch 100 from one position to the next, the ball rides over the land between successive notches 122 to cam the spring 117 momentarily and impart a pulse movement to the pushbutton. By this pulse actuation of the pushbutton the switch 105 is operated momentarily during the transit of the selector switch between successive positions.

The effect of the momentary actuation of the switch 105a during the movement of the selector switch 100a between successive positions, as abovedescribed, is to disconnect the condenser 56a from the coil of the relay 50a, discharge the condenser through the current-limiting resistor 106a, and then reconnect the discharged condenser across the relay coil by the time the selector switch 100a reaches its next position, it being understood that the current-limiting resistor 106a is given a suitable value to allow the condenser to be substantially discharged within the time mentioned. In other words, if the dictator's station 10a is operatively connected to an activated machine and the selector switch 100a is shifted to an adjacent position corresponding to an already-activated machine, the sequence of events is: (1) the coil of the privacy relay is disconnected from the rectified power supply provided from the source 29 through the rectifier 58*a*, (2) the condenser 56*a* is next disconnected from the privacy relay whereby to totally open the circuit of the relay to prevent back electromotive force in the relay from prolonging the current flow, (3) the condenser is discharged quickly through the low-resistance circuit including the resistor 106*a*, (4) the condenser is reconnected across the coil of the privacy relay, (5) the selector switch 100*a* makes contact at the next adjacent position, and (6) the condenser 56*a* shunts initially the current from the relay coil until the condenser is substantially charged whereby to assure that the relay will drop out if that has not already occurred.

If the condenser 56*a* were left permanently connected across the relay coil, the momentary disconnecting of the coil from the D. C. power source 25, which occurs as the selector switch is shifted from one position to the next, will not normally be effective to cause the relay to drop out within the necessary time interval because the condenser then provides a circuit for prolonging the current flow through the coil not only from the back E. M. F. in the coil but also from the charge in the condenser, with the result that the drop-out of the relay will be delayed normally beyond the time when the selector switch reaches the next adjacent position. However, it is found that upon discharging the condenser independently of relay coil and then reconnecting it across the coil at least by the time the selector switch reaches the next adjacent position, the relay will drop out reliably during the interim while the selector switch is being shifted between successive positions to assure against the possibility of the dictator connecting his station to an already-activated recording machine. Invasion of the privacy of another dictator's use of the system is therefore effectively prevented.

The particular embodiment of our invention herein shown and described is intended to be illustrative and not limitative of our invention since the same is subject to changes and modifications without departure from the scope of our invention, which we endeavor to express according to the following claims.

We claim:

1. In a remotely-controlled phonographic system including a plurality of attendants' stations each including a dictating machine having an audio circuit and means for activating the machine, and a plurality of dictators' stations each provided with station equipment including a transducer and an on-off station switch: the combination of branch circuits leading from each of said dictators' stations to each of said machines; a selector switch at each dictator's station shiftable into successive positions corresponding to said machines respectively; means for operatively connecting a dictator's station to a selected dictating machine as the respective station switch is moved to "on" position, comprising a privacy relay for each of said dictator's stations, a condenser connected across the coil of the privacy relay, means for supplying operating current via said station and selector switches to the coil of the privacy relay to initiate operation thereof upon moving the station switch to "on" position while the machine corresponding to the positioning of the selector switch is not activated, and circuit means conditioned by operation of the privacy relay for making connection of the dictator's station to the selected machine and for preventing connection of any other of said dictator's stations to said selected machine; and means controlled by each of said selector switches for stopping momentarily all flow of current through the coil of the respective privacy relay as the selector switch is shifted from one position to the next.

2. In a remotely-controlled phonographic system including a plurality of attendants' stations each including a dictating machine having A. C. and D. C. sources of power, an audio circuit and means for activating said machine; and a plurality of dictators' stations each provided with station equipment including a transducer and an on-off station switch: the combination of normally-open branch circuits leading from each of said machines to each of said stations; a selector switch at each dictator's station for selecting said branch circuits respectively; means for operatively connecting the equipment of a dictator's station via the respectively selected branch circuit to a dictating machine when the respective station switch is moved to "on" position, comprising a privacy relay operable only by direct current for each of said dictators' stations, means for operating said privacy relay from said D. C. source only upon closing the station switch while the machine corresponding to the selected branch circuit is not activated, and circuit means conditioned by operation of said privacy relay for making connection to said machine and for supplying rectified current from said A. C. source to said relay to maintain the relay operated and prevent connection of any other of said stations to said machine; a filter condenser connected across the coil of each privacy relay; and a switch means operatively coupled to each of said selector switches and connected to the respective privacy relay coil for momentarily electrically disabling the privacy relay as the selector switch is shifted from one position to the next.

3. The combination set forth in claim 2 comprising a current supply circuit from each dictating machine for said privacy relays, said current supply circuit being normally connected to the D. C. source of the dictating machine; a transfer relay for each machine responsive to activation of the machine for shifting said current supply circuit from said D. C. source to said A. C. source; and a condenser connected across each transfer relay adapted to delay drop-out of the transfer relay until after the drop-out of the privacy relay of the dictator's station when the machine is deactivated by return of the on-off switch of the dictator's station to "off" position.

4. In a remotely-controlled phonographic system including a plurality of attendants' stations each including a dictating machine having an audio circuit and means for activating the machine, and a plurality of dictator's stations each provided with station equipment including a transducer and an on-off station switch: the combination of branch circuits leading from each of said dictators' stations to each of said machines; a selector switch at each dictator's station shiftable into successive positions corresponding to said machines respectively; a privacy relay for each dictator's station; means for supplying direct current to initiate operation of a privacy relay only upon shifting the respective station switch to "on" position while the machine corresponding to the positioning of the respective selector switch is in unactivated condition; means responsive to operation of a privacy relay while the respective station switch is in "on" position for operatively connecting the station to the selected machine; condensers shunting respectively the coils of said privacy relays; and means controlled by each of said selector switches for discharging the respective condenser independently of the respective relay coil as the selector switch is shifted from one position to the next.

5. In a remotely-controlled phonographic system including a plurality of attendants' stations each including a dictating machine having an audio circuit and means for activating the machine, and a plurality of dictators' stations each provided with station equipment including a transducer and an on-off station switch: the combination of branch circuits leading from each of said dictators' stations to each of said machines; a selector switch at each dictator's station shiftable into successive positions corresponding to said machines respectively; a privacy relay for each dictator's station; means for supplying direct current to initiate operation of a privacy relay only upon shifting the respective station switch to "on" position while the machine corresponding to the positioning of the respective selector switch is in unactivated condition; means responsive to operation of a privacy relay while the respective station switch is in "on" position for operatively connecting the station to the selected machine; condensers shunting respectively the coils of said privacy relays; and means controlled by each of said selector switches for disconnecting the respective condenser from the associated relay coil, discharging the condenser and re-connecting the condenser across the relay coil as the selector switch is shifted from one position to the next.

6. The combination set forth in claim 5 wherein said last-stated means at each dictator's station comprises a discharge circuit; a control switch normally positioned to connect the respective condenser across the coil of the respective relay and operable to break the connection of the condenser across the relay coil and to connect the condenser across said discharge circuit; and means operable by the respective selector switch for normally operating said control switch as the selector switch is shifted from one position to the next.

7. In a remotely-controlled phonographic system including a plurality of attendants' stations each including a dictating machine having an audio circuit and means for activating the machine, and a plurality of dictators' stations each provided with station equipment including a transducer and an on-off station switch: the combination of branch circuits leading from each of said dictators' stations to each of said machines; a selector switch in the branch circuits at each dictator's station shiftable into successive positions corresponding to said machines respectively; a privacy relay for each dictator's station operable only by direct current; D. C. and A. C. power sources at each machine; circuit means at each machine for rendering the respective D. C. source available for operating said privacy relays respectively only when the machine is in unactivated condition; a rectifier for each of said A. C. power sources; means responsive to moving a station switch to "on" position while the respective selector switch is in a position corresponding to a selected unactivated machine for operating the respective privacy relay and activating said machine; means responsive to operation of said respective privacy relay for operatively connecting the respective station to said activated machine, for conditioning said circuit means to render the D. C. source at the activated machine unavailable for operating said privacy relays, and for connecting the respective privacy relay across the A. C. source at the activated machine via the respective rectifier to maintain the privacy relay operated; a condenser across the coil of each of said privacy relays; and means controlled by each of said selector switches for disconnecting the respective condenser from the associated relay coil, discharging the condenser and reconnecting the condenser across the relay coil as the selector switch is shifted from one position to the next.

No references cited.